(12) United States Patent
Kenney et al.

(10) Patent No.: US 8,879,996 B2
(45) Date of Patent: Nov. 4, 2014

(54) METHOD TO ENABLE WI-FI DIRECT USAGE IN RADAR BANDS

(75) Inventors: Thomas J. Kenney, Portland, OR (US); Eldad Perahia, Portland, OR (US); Myron P. Hattig, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 13/340,843

(22) Filed: Dec. 30, 2011

(65) Prior Publication Data

US 2013/0171941 A1 Jul. 4, 2013

(51) Int. Cl.
 *H04B 15/00* (2006.01)
 *H04B 17/00* (2006.01)
(52) U.S. Cl.
 USPC ...... 455/62; 455/63.1; 455/67.11; 455/452.1; 455/67.13; 455/434; 455/448; 455/450; 370/328; 370/335; 370/338; 342/20; 342/52
(58) Field of Classification Search
 USPC ......... 455/62, 450, 452.1, 67.11, 63.1, 67.13, 455/454, 448, 161.1, 168.1, 136, 161.2, 455/434; 370/328, 335, 338, 522; 342/20, 342/52, 92, 189
 See application file for complete search history.

(56) References Cited

U.S. PATENT DOCUMENTS

| | | | | |
|---|---|---|---|---|
| 7,269,151 B2 * | 9/2007 | Diener et al. | ................. | 370/329 |
| 7,564,816 B2 * | 7/2009 | McHenry et al. | ............. | 370/329 |
| 7,599,671 B2 * | 10/2009 | Kopikare et al. | ............. | 455/130 |
| 7,702,044 B2 * | 4/2010 | Nallapureddy et al. | ...... | 375/340 |
| 7,747,222 B2 * | 6/2010 | Nallapureddy et al. | ..... | 455/66.1 |
| 7,797,018 B2 * | 9/2010 | Chandra | ................... | 455/552.1 |
| 7,834,800 B1 * | 11/2010 | Chhabra et al. | ................. | 342/20 |
| 8,027,249 B2 * | 9/2011 | McHenry et al. | ............. | 370/221 |
| 8,041,317 B2 * | 10/2011 | Kopikare et al. | ............. | 455/130 |
| 8,155,649 B2 * | 4/2012 | McHenry et al. | ............. | 455/434 |
| 8,180,392 B2 * | 5/2012 | Sekiya et al. | ............. | 455/552.1 |
| 8,301,190 B2 * | 10/2012 | Chandra | ................... | 455/552.1 |
| 8,326,313 B2 * | 12/2012 | McHenry et al. | ............. | 455/454 |
| 8,346,174 B2 * | 1/2013 | Nallapureddy et al. | ..... | 455/66.1 |
| 8,363,630 B2 * | 1/2013 | Gong | ............................. | 370/338 |
| 8,462,043 B2 * | 6/2013 | Belcea | ......................... | 342/159 |
| 8,467,785 B2 * | 6/2013 | Montemurro et al. | ........ | 455/434 |
| 8,630,255 B1 * | 1/2014 | Kunz et al. | .................... | 370/331 |
| 2007/0275756 A1 * | 11/2007 | Choi | ............................. | 455/557 |

\* cited by examiner

*Primary Examiner* — Marceau Milord
(74) *Attorney, Agent, or Firm* — Schwegman Lundberg & Woessner

(57) ABSTRACT

A method and system for allowing a client device to establish a direct communications session such as Wi-Fi Direct service using the 5 GHz band. In one embodiment, a client device first establishes a direct communications session, in the 2.4 GHz band with another client device, and then, based on the content used in that service, establishes a 5 GHz service if needed.

18 Claims, 4 Drawing Sheets

METHOD TO ENABLE WI-FI DIRECT USAGE IN RADAR BANDS

Wireless networking based on the Wi-Fi IEEE 802.11 standards is one of the most widely adopted wireless technologies. An 802.11 network is based on a star topology with two types of wireless devices: clients and access points (APs). Access points (APs) provide an infrastructure function by communicating directly with wireless client devices and linking them to other networks such as the internet.

The 802.11 standards provide service over two frequency bands, 2.4 GHz and 5 GHz. The 2.4 GHz band is approximately 80 MHz in width and allows no more than three non-overlapping channels. The 5 GHz band provides between two and seven times the number of channels and resulting network capacity as the 2.4 GHz band. The 2.4 GHz band is the one most commonly used Wi-Fi devices and hence is the most crowded.

In most countries, however, portions of the 5 GHz band also are used by weather and military radar systems that have priority over Wi-Fi devices. In order to coexist with these critical systems, Wi-Fi radios must comply with Dynamic Frequency Selection (DFS) as defined by an 801.11 specification.

Compliance with DFS is required for both infrastructure (APs) and client devices operating in the 5 GHz band. Infrastructure devices play a larger role in managing DFS, however, as they basically manage the communications sessions with the client devices.

Before transmitting on a DFS channel, an infrastructure device must first listen for the presence of radar signals. If radar is detected, the channel must be vacated and flagged as unavailable. The infrastructure device must continue to monitor for the presence of radar during operation and, if radar is detected, must move to an unoccupied channel and instruct all associated client devices to move also. Client devices are not allowed to transmit on a DFS channel unless instructed by an infrastructure device that the channel is free from radar.

Wi-Fi Direct is an 802.11-defined mechanism that allows a client device to establish a direct communications session (referred to as a Wi-Fi Direct service) with one or more other client devices without the need for an AP. The client device that establishes the Wi-Fi Direct service is said to form a group and, as group owner, manages the peer-to-peer connections with the other devices in the group.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Current Wi-Fi client products do not support operation for Wi-Fi Direct in the 5 GHz band (unless an AP is present). The primary reasons for this relate to the stringent requirements imposed by the Federal Communications Commission to operate in the DFS portion of the 5 GHz band. As noted above, DFS is a mechanism to allow unlicensed devices to share spectrum with existing radar systems. For a client to operate using Wi-Fi Direct and become a Group Owner (or in FCC terms, a DFS Master), it must scan channels for very long durations and continuously monitor for any radar activity. Thus, currently, all Wi-Fi Direct devices operate in the 2.4 GHz bands where this burden is not required, and the socialization channels where Wi-Fi Direct is initiated are only defined in the 2.4 GHz bands (as channels 1, 6, and 11).

Figure 1:
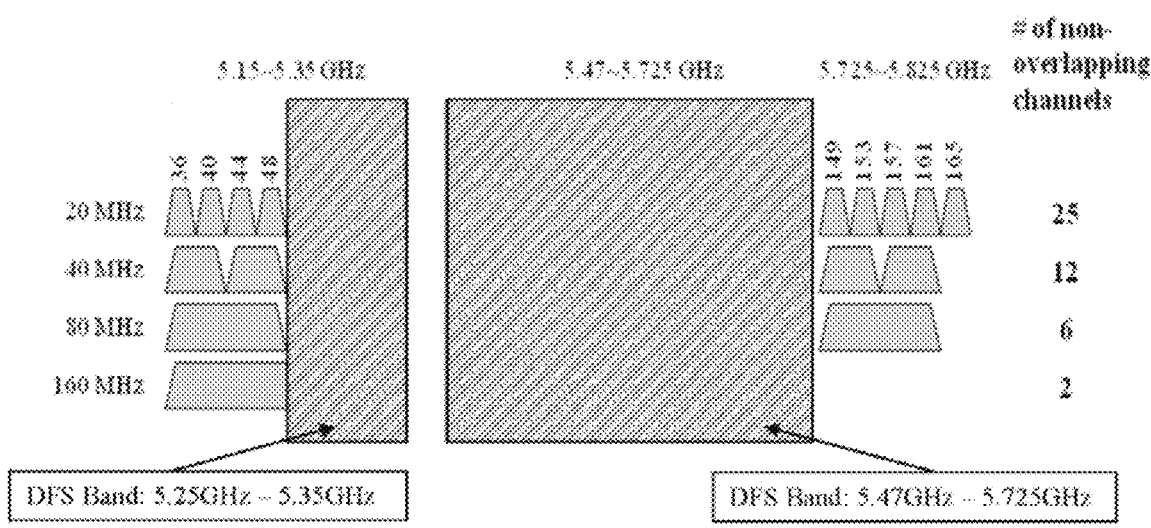
FIG. 1 illustrates the spectrum of the 5 GHz band.

FIG. 1 shows the spectrum and channel allocations of the 5 GHz band which occupies a frequency band from 5.15 GHz to 5.35 GHz and a band from 5.47 GHz to 5.825 GHz. The DFS bands are from 5.25 GHz to 5.35 GHz and from 5.47 GHz to 5.725 GHz. The DFS bands are thus a large portion of the 5 GHz band, and avoiding them limits the channel options and bandwidths. The advantages of operating a service in the 5 GHz band are that there are currently far fewer devices at 5 GHz, much more spectrum is available, and wider available channels. In the 2.4 GHz band, the largest bandwidth available is 40 MHz, which in many situations cannot be established due to the larger number of devices also operating in the band. Thus, with all the devices using various versions of 802.11 (802.11b/g/n), finding a contiguous 40 MHz channel that allows 40 MHz operation is very difficult, and only 20 MHz is typically available. In the 5 GHz band, with the adoption of 802.11ac, channel widths of up to 160 MHz are possible. This provides an increase in data rate and throughput which is very desirable for video services or file transfers.

The present disclosure relates, in one embodiment, to a method and system which a client device first establishes a direct communications session, such as a Wi-Fi Direct service, in the 2.4 GHz band with another client device, and then, based on the content used in that service, establishes a 5 GHz service if needed. The concept is to allow simultaneous scanning of the 5 GHz band while a Wi-Fi Direct service is connected and operating in the 2.4 GHz band. Then, based on system/user requirements, the services may be mapped to, or shared with, a 5 GHz service. In an alternative embodiment, one or more Wi-Fi Direct socialization channels are provided in the 5 GHz band. In this approach, a Wi-Fi Direct link is established in the 5 GHz band, but at a channel where DFS rules do not apply. After initial establishment of the link, all channels of the 5 GHz band, including the DFS channels, are usable for the Wi-Fi Direct service.

In one embodiment, after a user requests a Wi-Fi Direct service, the service would be established in the 2.4 GHz band so that the user would immediately get the requested services. The device next determines if the requested service needs more bandwidth and, if so, prepares to transfer a part or all of the service to the 5 GHz band. In one alternative, the device would start DFS scanning in the 5 GHz band based on the requested service and its bandwidth requirements. Alternatively, the scan of the 5 GHz band is initiated immediately after establishing a Wi-Fi Direct service in anticipation of more bandwidth being needed. Services that would require higher quality of service (QOS) and/or throughput include those such as video services and file transfers. Additionally, operation at the 5 GHz band allows advanced video features like adaptive video quality. If the user is using a video service, the device determines the video quality required for that service. If the video service is of lower quality, or low resource demand, the device could decide to remain on the 2.4 GHz band. If it determines the service is of higher QOS, it would continue the current service at 2.4 GHz, while starting a scan at the 5 GHz (unless the scan was already initiated at the inception of the Wi-Fi Direct service). The device, using an architecture such as described below, scans the DFS bands as required by the FCC in order for the device to become a Group Owner (DFS Master). One of the FCC requirements is that the device must scan each channel for one minute to determine if any radar signals are present and must do this for all DFS channels that it wishes to use. This could take some time since a significant portion of the 5 GHz band is DFS as shown in FIG. 1. During the process, the 2.4 GHz video service would still be active, but at a lower QOS than possible in the 5 GHz. The scanning would continue until a radar free channel or group of channels is found. The number of channels to scan and identify as radar free may be based on the desired video rate, desired QOS, and/or other parameters (battery life, multiple services, etc) as well as hardware architecture.

Once the channel or channels are found in the 5 GHz band, the device may do one of several things. It may continue the 2.4 GHz service until it is deemed necessary to improve QOS or data rate, at which point the device transfers the service to the 5 GHz band. Alternatively, it could move the Wi-Fi Direct link to the 5 GHz band immediately and disconnect the 2.4 GHz service. Or, it could keep the 2.4 GHz Wi-Fi Direct link up, establish a 5 GHz Wi-Fi Direct link, use the high speed service for a duration and, after completion of the high speed service, return to the 2.4 GHz service. This latter mode of operation is useful in the case where a large file needs to be transferred quickly, and after that the requirements are lower. Also, if the other device(s) are far away, operation in 2.4 GHz may require less resources (bandwidth, streams, power, etc), and thus it may be of advantage for the lower QOS or lower data rate services to remain in the 2.4 GHz band. The disclosed method and system thus allows flexibility in configuring the system to optimize according to the attribute most important to the user, application, or device.

The approach as described herein may thus give significantly better video and file transfer service to a Wi-Fi Direct application. It additionally enables simultaneous Wi-Fi Direct links to provide adaptive QOS and the ability to optimize system resources based on the application. It also allows the use of the 802.11 ac standard and its larger bandwidths (80 and 160 MHz).

Figure 2:
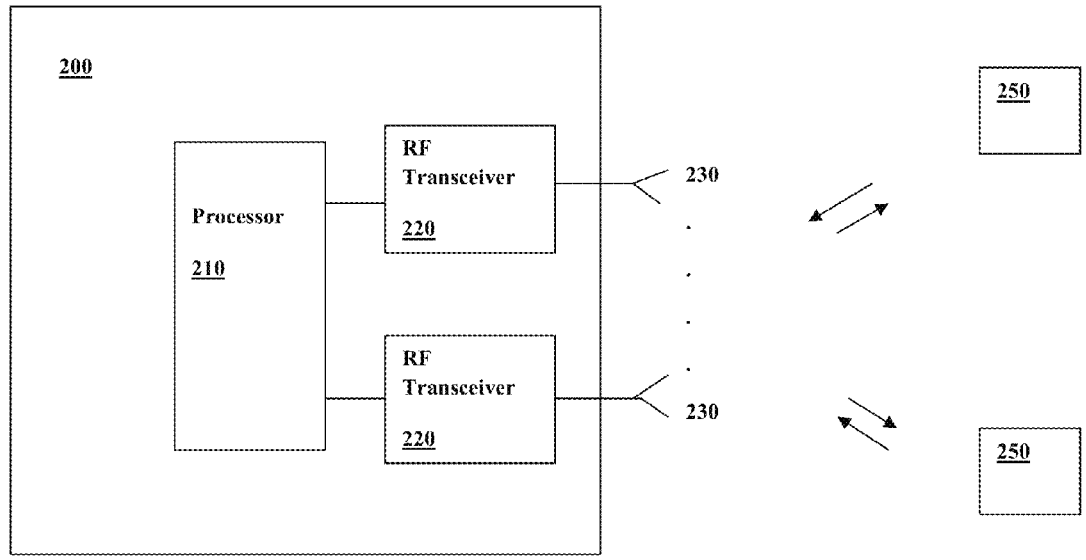
FIG. 2 shows an example device architecture for providing direct communications services.

The impact to the system design in providing the described mode of operation is dependent on the architectural approach taken. Two example architectures for enabling Wi-Fi Direct services in the 5 GHz band are as follows. A first example exploits the use of multiple Rx/Tx chains (i.e., RF transceivers with associated antennas) that are sometimes incorporated into Wi-Fi devices. FIG. 2 illustrates an example system that includes a client device 200 that establishes Wi-Fi Direct services with other client devices 250. The client device 200 includes a processor 210 (which has associated processing circuitry such as memory) that is interfaced to multiple RF (radio-frequency) transceivers 220, each having an antenna 230. The device 200 would then utilize one of the Rx/Tx chains to do a scan in the DFS bands to meet the requirements. In this case, only one Rx/Tx chain is required to do the scanning at 5 GHz, and, after the scan, may be used for the 2.4 GHz service. In this approach, there is minimal impact in terms of cost and complexity to a typical multiband (2.4 GHz and 5 GHz) device.

Figure 3:
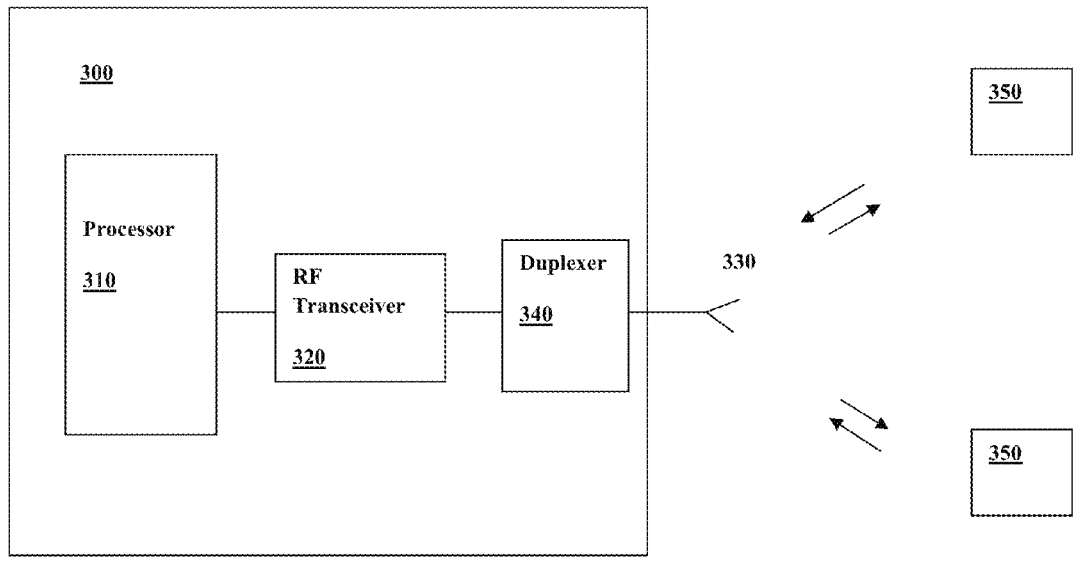
FIG. 3 shows another example device architecture for providing direct communications services.

The second example architecture involves using a single Rx/Tx path to simultaneously operate in the 2.4 GHz band while scanning in the 5 GHz band. In order to do this, a duplexer is required for the RF transceiver. A duplexer is a device that allows a transmitter operating on one frequency and a receiver operating on a different frequency to share a common antenna. In this approach the duplexer is required since the scanning of the DFS bands would be done continuously while the Wi-Fi 2.4 GHz service is occurring simultaneously on the same Rx/Tx chain. In that case, the 2.4 GHz could be transmitting while the 5 GHz is scanning (receiving). The duplexer prevents the 2.4 GHz transmit signal from desensitizing the 5 GHz receiver. If the device incorporates multiple RF transceivers, the other Rx/Tx paths would not require a duplexer since only one would be needed for the scanning at 5 GHz. This approach would allow all Rx/Tx paths to be used while scanning in the 5 GHz. Although the addition of a duplexer may increase the overall device complexity/cost, this type of architecture may also be used in devices with only a single antenna. FIG. 3 illustrates an example system that includes a client device 300 that establishes Wi-Fi Direct services with other client devices 350. The client device 300 includes a processor 310 (that includes associated processing circuitry such as memory) that is interfaced to an RF transceiver 320. The RF transceiver is connected to an antenna 330 through a duplexer 340.

Figure 4:
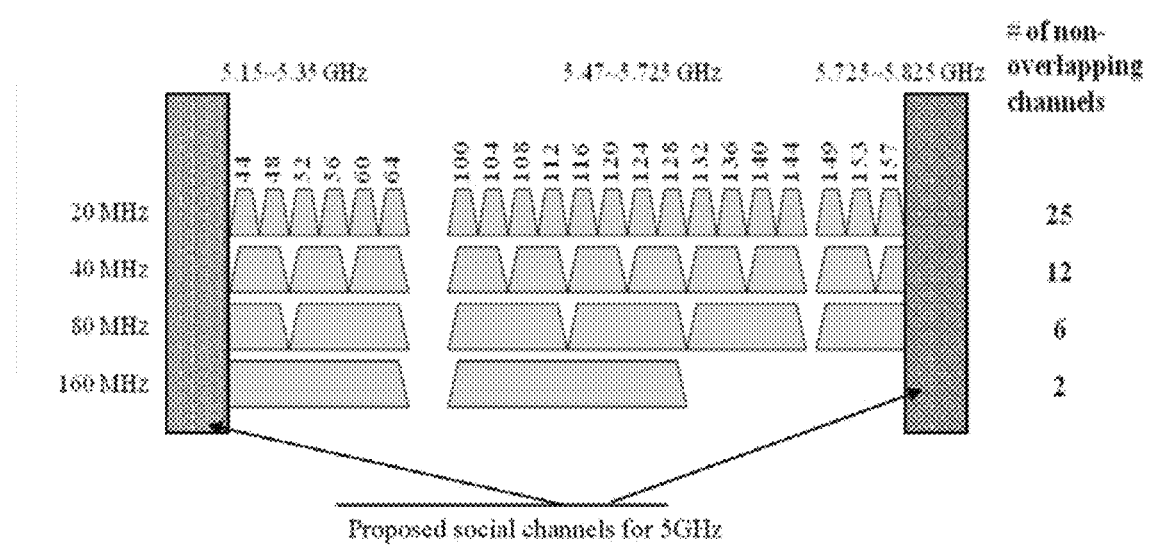
FIG. 4 illustrates the spectrum of the 5 GHz with socialization channels for establishing a direct communications service in the 5 GHz band.

In an alternate embodiment, the disclosed method and system could allow Wi-Fi Direct services to use the 5 GHz band solely, without needing a 2.4 GHz connection. In this embodiment, one or more socialization channels are created in the 5 GHz band. To allow a device to use this technique efficiently, the socialization channels may be located at the 5 GHz band edges as shown in FIG. 4 and not in the DFS portion of the band. The socialization channels are shown as occupying the non-DFS portions of the 5 GHz band from 5.15 GHz to 5.25 GHz and from 5.725 GHz to 5.825 GHz. The reason for this is to allow more cost effective and smaller devices by simplifying the duplexer design as a duplexer is more easily implemented when there is more separation between the two bands that are being duplexed. A device such as illustrated in FIG. 2 having multiple RF transceivers, or a device as illustrated in FIG. 3 having an RF transceiver that incorporates a duplexer, may then be configured to, as a group owner, establish a direct communications service with one or more other devices using the non-DFS socialization channels of 5 GHz band. The device then scans one or more DFS-required channels of the 5 GHz band for radar or other activity to determine their availability, and, if one or more channels of the 5 GHz band are available, moves at least part of the communications service with the other device to the DFS-required channels of 5 GHz band. The moving of at least a part of the communications session to the DFS-required channels may be conditioned upon whether or not a higher quality of service is needed.

Figure 5:
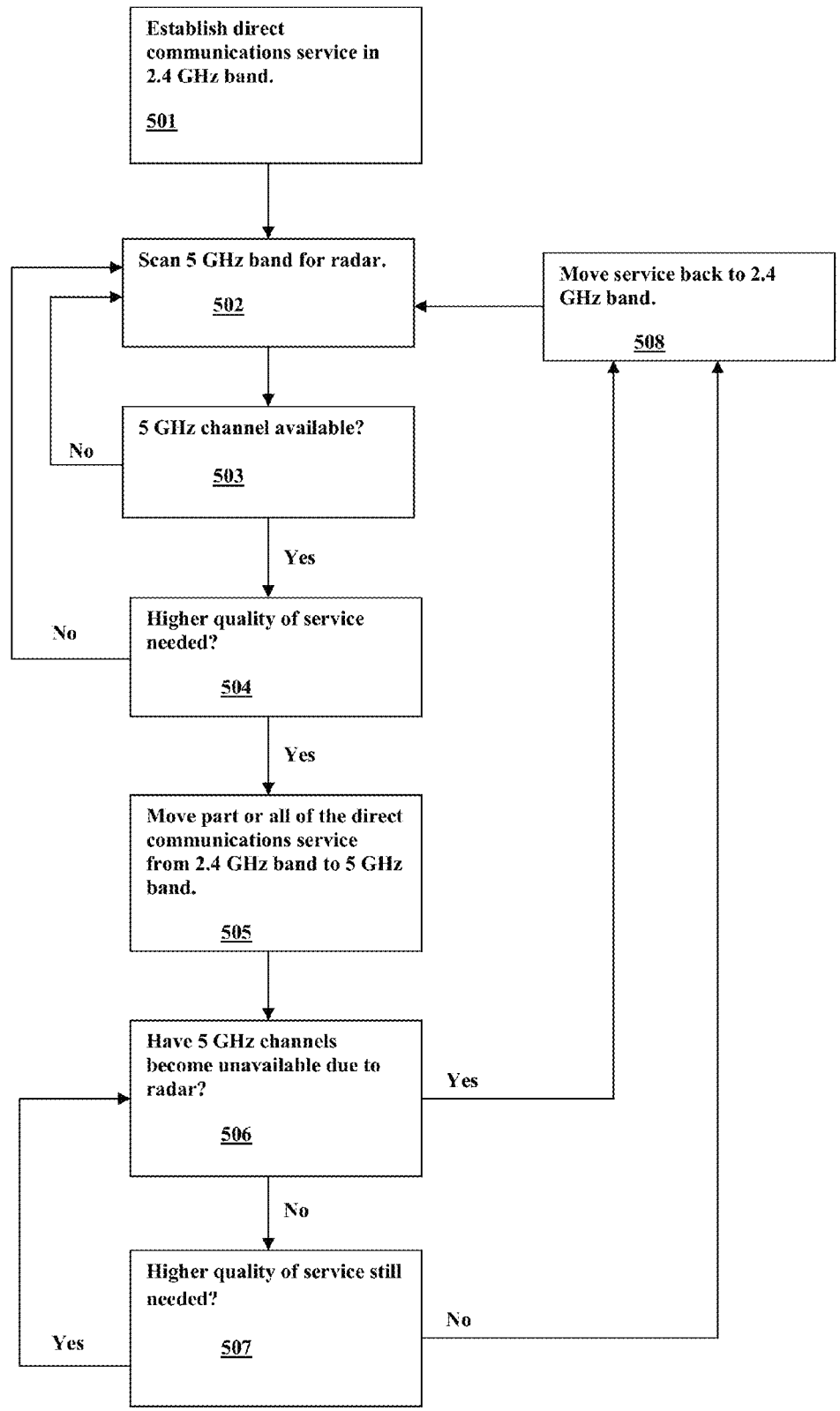
FIG. 5 illustrates an example procedure by which a client device establishes a direct communications service with another client device in the 5 GHz band.

FIG. 5 illustrates an example of a procedure that may be performed by the controller of a client device, such as an 802.11 compliant client device, in order to establish a Wi-Fi Direct service with another client device over the 5 GHz band. The example device includes an RF transceiver operated by the controller that is capable of operating in the 2.4 GHz band and the 5 GHz band. The controller is configured to, as a group owner, establish a direct communications service with one or more other devices using the 2.4 GHz band, shown as step 501. At step 502, the device then scans one or more DFS-required channels of the 5 GHz band for radar or other activity to determine their availability. At step 503, it is determined if one or more channels of the 5 GHz band are available. If not, the device continues to scan the 5 GHz band. If a 5 GHz channel is available, the device determines if a higher quality of service is needed by the communications session at step 504. (Alternatively, the device could perform step 504 prior to deciding whether or not to scan the 5 GHz band.) If a higher quality of service is not needed, the device returns to scanning the 5 GHz band at step 502. If a higher quality of service is needed, the device moves at least part of the 2.4 GHz communications service with the other device to the 5 GHz at step 505. (The 2.4 GHz service may or may not be maintained after establishment of the 5 GHz service.) The device then continues to provide the direct communications service over the 5 GHz band until the 5 GHz channels become unavailable as determined at step 506, at which point the device moves the service back to the 2.4 GHz band at step 508 and returns to step 502. At step 507, the device checks the presently required quality of service while operating in the 5 GHz band and, the if quality of service requirements are low enough, the device moves the service back to the 2.4 GHz band at step 508 and returns to step 502.

In the alternate embodiment described above, rather than initially establishing a direct communications service over the 2.4 GHz band at step 501, the non-DFS socialization channels of the 5 GHz band are used instead. In that embodiment, the client device would not necessarily even have to have the capability for operating the 2.4 GHz band.

The method for providing a Wi-Fi Direct service over the 5 GHz band as described above may be implemented in client devices with various hardware configurations that may include a processor for executing instructions that perform the described operations. Such instructions may be contained in a suitable storage medium from which they are transferred to a memory or other processor-executable medium.

The embodiments as described herein may be implemented in a number of environments. In some embodiments, the receiver may be part of a wireless local area network (WLAN) communication station such as a wireless access point (AP), base station or a mobile device including a Wireless Fidelity (WiFi) device.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the invention is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the invention is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

The invention has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for operating a device having an RF (radio-frequency) transceiver and capable of operating in a 2.4 GHz band and a 5 GHz band, comprising:
   as a group owner, establishing a direct communications service with one or more other devices using the 2.4 GHz band;
   scanning one or more DFS-required (Dynamic Frequency Selection-required) channels of the 5 GHz band for radar or other activity to determine their availability;
   if one or more channels of the 5 GHz band are available, moving at least part of the direct communications service with the other device from the 2.4 GHz band to the 5 GHz band if a higher quality of service is needed; and
   if at least part of the direct communications service has been moved to the 5 GHz band and channels in the 5 GHz band become unavailable due to radar, moving the direct communications service back to the 2.4 GHz band.

2. The method of claim 1 wherein the device is equipped with multiple RF transceivers and further comprising using one RF transceiver to monitor the 5 GHz band for activity when the direct communications service is over the 2.4 GHz band.

3. The method of claim 1 wherein the device further comprises a duplexer to allow the RF transceiver to monitor the 5 GHz band white transmitting over the 2.4 GHz band.

4. The method of claim 1 further comprising moving the communications session back to the 2.4 GHz band if quality of service requirements are low enough.

5. The method of claim 1 further comprising beginning scanning of the 5 GHz band for available channels immediately upon establishing a direct communications service in the 2.4 GHz band.

6. The method of claim 1 further comprising beginning scanning of the 5 GHz band for available channels based on QOS requirements after establishing the direct communications service in the 2.4 GHz band.

7. The method of claim 1 further comprising continuing a portion of the direct communications service in the 2.4 GHz band after establishing a communications service in the 5 GHz band.

8. The method of claim 1 further comprising establishing, as a group owner, a direct communications service with one or more other devices using one or more non-DFS-required channels at the edges of the 5 GHz band.

9. A medium containing processor-executable instructions for executing the method recited by claim 1.

10. A device, comprising:
- an RF transceiver operated by a processor, wherein the device is capable of operating in a 2.4 GHz band and a 5 GHz band;
- wherein the processor is configured to:
- as a group owner, establish a direct communications service with one or more other devices using the 2.4 GHz band;
- scan one or more DES-required (Dynamic Frequency Selection-required) channels of the 5 GHz band for radar or other activity to determine their availability;
- if one or more channels of the 5 GHz band are available, move a least part of the direct communications service with the other device from the 2.4 GHz band to the 5 GHz band if a higher quality of service is needed; and
- if at least part of the direct communications service has been moved to the 5 GHz band and channels in the 5 GHz band become unavailable due to radar, move the direct communications service back to the 2.4 GHz band.

11. The device of claim 10 wherein the device is equipped with multiple RF transceivers and the processor is configured to use one RF transceiver to monitor the 5 GHz band for activity when the direct communications service is over the 2.4 GHz band.

12. The device of claim 10 further comprising a duplexer to allow the RF transceiver to monitor the 5 GHz band while transmitting over the 2.4 GHz band.

13. The device of claim 10 wherein the processor is configured to move the communications session back to the 2.4 GHz band if quality of service requirements are low enough.

14. The device of claim 10 wherein the processor is configured begin scanning the 5 GHz band for available channels immediately upon establishing a direct communications service in the 2.4 GHz band.

15. The device of claim 10 wherein the processor is configured to begin scanning the 5 GHz band for available channels based on QOS requirements after establishing the direct communications service in the 2.4 GHz band.

16. The device of claim 10 wherein the processor is configured to continue a portion of the direct communications service in the 2.4 GHz band after establishing a communications service in the 5 GHz band.

17. The device of claim 10 wherein the process is further configured to establish, as a group owner, a direct communications service with one or more other devices using one or more non-DFS-required channels at the edges of the 5 GHz band.

18. The device of claim 10 wherein the device is 802.11 compliant.

* * * * *

UNITED STATES PATENT AND TRADEMARK OFFICE
CERTIFICATE OF CORRECTION

| | | |
|---|---|---|
| PATENT NO. | : 8,879,996 B2 | Page 1 of 1 |
| APPLICATION NO. | : 13/340843 | |
| DATED | : November 4, 2014 | |
| INVENTOR(S) | : Kenney et al. | |

It is certified that error appears in the above-identified patent and that said Letters Patent is hereby corrected as shown below:

In the claims

In column 6, line 64, in Claim 3, delete "white" and insert --while--, therefor

In column 7, line 27, in Claim 10, delete "DES-required" and insert --DFS-required--, therefor In column 7, line 31, in Claim 10, delete "a" and insert --at--, therefor Signed and Sealed this
Twenty-fourth Day of November, 2015

Michelle K. Lee
*Director of the United States Patent and Trademark Office*